(12) United States Patent
Belverato

(10) Patent No.: US 9,980,189 B2
(45) Date of Patent: May 22, 2018

(54) DIVERSITY BLUETOOTH SYSTEM AND METHOD

(71) Applicant: BRAGI GmbH, München (DE)

(72) Inventor: Luigi Belverato, München (DE)

( * ) Notice: Subject to any disclaimer, the term of this patent is extended or adjusted under 35 U.S.C. 154(b) by 0 days. days.

(21) Appl. No.: 15/290,811

(22) Filed: Oct. 11, 2016

(65) Prior Publication Data

US 2017/0111834 A1   Apr. 20, 2017

Related U.S. Application Data

(60) Provisional application No. 62/244,167, filed on Oct. 20, 2015.

(51) Int. Cl.
*H04B 5/00* (2006.01)
*H04B 7/00* (2006.01)
(Continued)

(52) U.S. Cl.
CPC .......... *H04W 36/06* (2013.01); *H04B 5/0006* (2013.01); *H04R 1/1091* (2013.01);
(Continued)

(58) Field of Classification Search
CPC .. H04B 1/3805; H04B 1/406; H04N 5/23212; H04N 5/23296; H04N 7/142; H04N 7/18;
(Continued)

(56) References Cited

U.S. PATENT DOCUMENTS 3,934,100 A   1/1976   Harada
4,150,262 A   4/1979   Ono
(Continued)

FOREIGN PATENT DOCUMENTS

EP   1017252 A2   7/2000
EP   2871857 A1   5/2015
(Continued)

OTHER PUBLICATIONS

International Search Report & Written Opinion, PCT/EP2016/075130 (dated Feb. 2, 2017).
(Continued)

*Primary Examiner* — Yuwen Pan
*Assistant Examiner* — Paul P Tran
(74) *Attorney, Agent, or Firm* — Goodhue, Coleman & Owens, P.C.

(57) ABSTRACT

A first device having a transceiver and an antenna operatively connected to the transceiver and a second device having a transceiver and an antenna operatively connected to the transceiver, the first device in operative communication with the second device through a communications linkage separate from the transceiver of the first device and the transceiver of the second device. The first device is adapted to wirelessly communicate with a remote device through the transceiver of the first device. The second device is adapted to wirelessly communicate with the remote device through the transceiver of the second device. The system is configured to evaluate the wireless connection between the first device and the remote device and to evaluate the wireless communication between the second device and the remote device and determine whether the first device or the second device has a better connection.

20 Claims, 3 Drawing Sheets

(51) Int. Cl.

| | | |
|---|---|---|
| *H04W 36/00* | (2009.01) | |
| *H04M 1/00* | (2006.01) | |
| *H04L 12/28* | (2006.01) | |
| *H04W 4/00* | (2018.01) | |
| *H04R 25/00* | (2006.01) | |
| *G10K 11/16* | (2006.01) | |
| *H03B 29/00* | (2006.01) | |
| *H04R 1/10* | (2006.01) | |
| *H04W 36/06* | (2009.01) | |
| *H04W 72/02* | (2009.01) | |
| *H04R 5/033* | (2006.01) | |
| *H04B 7/08* | (2006.01) | |

(52) U.S. Cl.
   CPC ............ *H04R 5/033* (2013.01); *H04W 4/008* (2013.01); *H04W 72/02* (2013.01); *H04B 7/08* (2013.01); *H04R 2420/07* (2013.01)

(58) Field of Classification Search
   CPC .. H04N 21/41; G06F 1/1686; G06K 9/00268; G06K 9/0061; H04M 1/0272; H04M 1/0266; H04M 1/0264; H04M 1/0216; H04M 1/04; H04M 1/2535; H04M 1/6016; H04M 1/6066; H04M 1/6075; H04M 1/725; H04M 1/733; H04M 1/72527; H04L 12/6418; H04L 12/66; H04L 41/0809; H04L 63/0281; H04L 63/04
   USPC ......... 455/11.1, 41.1, 41.2, 41.3, 557, 569.1, 455/575.2; 370/254, 338; 381/107, 151, 381/311, 315, 328, 71.6, 74
   See application file for complete search history.

(56) References Cited

U.S. PATENT DOCUMENTS

| | | | |
|---|---|---|---|
| 4,334,315 A | 6/1982 | Ono et al. | |
| 4,375,016 A | 2/1983 | Harada | |
| 4,588,867 A | 5/1986 | Konomi | |
| 4,654,883 A | 3/1987 | Iwata | |
| 4,682,180 A | 7/1987 | Gans | |
| 4,791,673 A | 12/1988 | Schreiber | |
| 4,865,044 A | 9/1989 | Wallace et al. | |
| 5,191,602 A | 3/1993 | Regen et al. | |
| 5,201,007 A | 4/1993 | Ward et al. | |
| 5,280,524 A | 1/1994 | Norris | |
| 5,295,193 A | 3/1994 | Ono | |
| 5,298,692 A | 3/1994 | Ikeda et al. | |
| 5,343,532 A | 8/1994 | Shugart | |
| 5,363,444 A | 11/1994 | Norris | |
| 5,497,339 A | 3/1996 | Bernard | |
| 5,606,621 A | 2/1997 | Reiter et al. | |
| 5,613,222 A | 3/1997 | Guenther | |
| 5,692,059 A | 11/1997 | Kruger | |
| 5,721,783 A | 2/1998 | Anderson | |
| 5,749,072 A | 5/1998 | Mazurkiewicz et al. | |
| 5,771,438 A | 6/1998 | Palermo et al. | |
| 5,802,167 A | 9/1998 | Hong | |
| 5,929,774 A | 7/1999 | Charlton | |
| 5,933,506 A | 8/1999 | Aoki et al. | |
| 5,949,896 A | 9/1999 | Nageno et al. | |
| 5,987,146 A | 11/1999 | Pluvinage et al. | |
| 6,021,207 A | 2/2000 | Puthuff et al. | |
| 6,054,989 A | 4/2000 | Robertson et al. | |
| 6,081,724 A | 6/2000 | Wilson | |
| 6,094,492 A | 7/2000 | Boesen | |
| 6,111,569 A | 8/2000 | Brusky et al. | |
| 6,112,103 A | 8/2000 | Puthuff | |
| 6,157,727 A | 12/2000 | Rueda | |
| 6,167,039 A | 12/2000 | Karlsson et al. | |
| 6,181,801 B1 | 1/2001 | Puthuff et al. | |
| 6,208,372 B1 | 3/2001 | Barraclough | |
| 6,275,789 B1 | 8/2001 | Moser et al. | |
| 6,339,754 B1 | 1/2002 | Flanagan et al. | |
| 6,408,081 B1 | 6/2002 | Boesen | |
| D464,039 S | 10/2002 | Boesen | |
| 6,470,893 B1 | 10/2002 | Boesen | |
| D468,299 S | 1/2003 | Boesen | |
| D468,300 S | 1/2003 | Boesen | |
| 6,542,721 B2 | 4/2003 | Boesen | |
| 6,560,468 B1 | 5/2003 | Boesen | |
| 6,654,721 B2 | 11/2003 | Handelman | |
| 6,664,713 B2 | 12/2003 | Boesen | |
| 6,694,180 B1 | 2/2004 | Boesen | |
| 6,718,043 B1 | 4/2004 | Boesen | |
| 6,738,485 B1 | 5/2004 | Boesen | |
| 6,748,095 B1 | 6/2004 | Goss | |
| 6,754,358 B1 | 6/2004 | Boesen et al. | |
| 6,784,873 B1 | 8/2004 | Boesen et al. | |
| 6,823,195 B1 | 11/2004 | Boesen | |
| 6,852,084 B1 | 2/2005 | Boesen | |
| 6,879,698 B2 | 4/2005 | Boesen | |
| 6,892,082 B2 | 5/2005 | Boesen | |
| 6,920,229 B2 | 7/2005 | Boesen | |
| 6,952,483 B2 | 10/2005 | Boesen et al. | |
| 6,987,986 B2 | 1/2006 | Boesen | |
| 7,136,282 B1 | 11/2006 | Rebeske | |
| 7,203,331 B2 | 4/2007 | Boesen | |
| 7,209,569 B2 | 4/2007 | Boesen | |
| 7,215,790 B2 | 5/2007 | Boesen et al. | |
| 7,463,902 B2 | 12/2008 | Boesen | |
| 7,508,411 B2 | 3/2009 | Boesen | |
| 7,558,529 B2* | 7/2009 | Seshadri | H04M 1/6033 455/41.2 |
| 7,778,657 B2* | 8/2010 | Lin | H04W 52/241 455/522 |
| 7,983,628 B2 | 7/2011 | Boesen | |
| 8,140,357 B1 | 3/2012 | Boesen | |
| 8,363,823 B1* | 1/2013 | Santos | H04R 1/1041 379/430 |
| 9,467,796 B1* | 10/2016 | Caine | H04W 4/001 |
| 2001/0005197 A1 | 6/2001 | Mishra et al. | |
| 2001/0027121 A1 | 10/2001 | Boesen | |
| 2001/0056350 A1 | 12/2001 | Calderone et al. | |
| 2002/0002413 A1 | 1/2002 | Tokue | |
| 2002/0007510 A1 | 1/2002 | Mann | |
| 2002/0010590 A1 | 1/2002 | Lee | |
| 2002/0030637 A1 | 3/2002 | Mann | |
| 2002/0046035 A1 | 4/2002 | Kitahara et al. | |
| 2002/0057810 A1 | 5/2002 | Boesen | |
| 2002/0076073 A1 | 6/2002 | Taenzer et al. | |
| 2002/0118852 A1 | 8/2002 | Boesen | |
| 2003/0065504 A1 | 4/2003 | Kraemer et al. | |
| 2003/0100331 A1 | 5/2003 | Dress et al. | |
| 2003/0104806 A1 | 6/2003 | Ruef et al. | |
| 2003/0115068 A1 | 6/2003 | Boesen | |
| 2003/0125096 A1 | 7/2003 | Boesen | |
| 2003/0218064 A1 | 11/2003 | Conner et al. | |
| 2004/0070564 A1 | 4/2004 | Dawson et al. | |
| 2004/0160511 A1 | 8/2004 | Boesen | |
| 2004/0170122 A1* | 9/2004 | Guo | H04W 36/30 370/210 |
| 2005/0043056 A1 | 2/2005 | Boesen | |
| 2005/0125320 A1 | 6/2005 | Boesen | |
| 2005/0148883 A1 | 7/2005 | Boesen | |
| 2005/0165663 A1 | 7/2005 | Razumov | |
| 2005/0196009 A1 | 9/2005 | Boesen | |
| 2005/0251455 A1 | 11/2005 | Boesen | |
| 2005/0266876 A1 | 12/2005 | Boesen | |
| 2006/0029246 A1 | 2/2006 | Boesen | |
| 2006/0074671 A1 | 4/2006 | Farmaner et al. | |
| 2006/0074808 A1 | 4/2006 | Boesen | |
| 2007/0147629 A1* | 6/2007 | Chiloyan | H04R 1/1033 381/74 |
| 2007/0149261 A1* | 6/2007 | Huddart | H04R 5/033 455/575.2 |
| 2008/0101279 A1* | 5/2008 | Russell | H04M 1/6066 370/328 |
| 2008/0254780 A1 | 10/2008 | Kuhl et al. | |

(56) References Cited

U.S. PATENT DOCUMENTS

| | | | | |
|---|---|---|---|---|
| 2009/0046869 A1* | 2/2009 | Griffin, Jr. | ............. | H04R 5/033 381/74 |
| 2014/0294193 A1* | 10/2014 | Tikander | .................. | H04R 3/02 381/74 |
| 2016/0219358 A1* | 7/2016 | Shaffer | ................ | H04R 1/1041 |

FOREIGN PATENT DOCUMENTS

| | | |
|---|---|---|
| GB | 2074817 | 4/1981 |
| JP | 06292195 | 10/1998 |
| WO | 2014043179 A2 | 3/2014 |
| WO | 2015110577 A1 | 7/2015 |
| WO | 2015110587 A1 | 7/2015 |

OTHER PUBLICATIONS

Announcing the $3,333,333 Stretch Goal (Feb. 24, 2014).
BRAGI is on Facebook (2014).
BRAGI Update—Arrival of Prototype Chassis Parts—More People—Awesomeness (May 13, 2014).
BRAGI Update—Chinese New Year, Design Verification, Charging Case, More People, Timeline(Mar. 6, 2015).
BRAGI Update—First Sleeves From Prototype Tool—Software Development Kit (Jun. 5, 2014).
BRAGI Update—Let's Get Ready to Rumble, A Lot to Be Done Over Christmas (Dec. 22, 2014).
BRAGI Update—Memories From April—Update on Progress (Sep. 16, 2014).
BRAGI Update—Memories from May—Update on Progress—Sweet (Oct. 13, 2014).
BRAGI Update—Memories From One Month Before Kickstarter—Update on Progress (Jul. 10, 2014).
BRAGI Update—Memories From the First Month of Kickstarter—Update on Progress (Aug. 1, 2014).
BRAGI Update—Memories From the Second Month of Kickstarter—Update on Progress (Aug. 22, 2014).
BRAGI Update—New People @Bragi—Prototypes (Jun. 26, 2014).
BRAGI Update—Office Tour, Tour to China, Tour to CES (Dec. 11, 2014).
BRAGI Update—Status on Wireless, Bits and Pieces, Testing—Oh Yeah, Timeline(Apr. 24, 2015).
BRAGI Update—The App Preview, The Charger, The SDK, BRAGI Funding and Chinese New Year (Feb. 11, 2015).
BRAGI Update—What We Did Over Christmas, Las Vegas & CES (Jan. 19, 2014).
BRAGI Update—Years of Development, Moments of Utter Joy and Finishing What We Started(Jun. 5, 2015).
BRAGI Update—Alpha 5 and Back to China, Backer Day, On Track(May 16, 2015).
BRAGI Update—Beta2 Production and Factory Line(Aug. 20, 2015).
BRAGI Update—Certifications, Production, Ramping Up (Nov. 13, 2015).
BRAGI Update—Developer Units Shipping and Status(Oct. 5, 2015).
BRAGI Update—Developer Units Started Shipping and Status (Oct. 19, 2015).
BRAGI Update—Developer Units, Investment, Story and Status(Nov. 2, 2015).
BRAGI Update—Getting Close(Aug. 6, 2014).
BRAGI Update—On Track, Design Verification, How It Works and What's Next(Jul. 15, 2015).
BRAGI Update—On Track, On Track and Gems Overview (Jun. 24, 2015).
BRAGI Update—Status on Wireless, Supply, Timeline and Open House@Bragi(Apr. 1, 2015).
BRAGI Update—Unpacking Video, Reviews on Audio Perform and Boy Are We Getting Close(Sep. 10, 2015).
Last Push Before The Kickstarter Campaign Ends on Monday 4pm CET (Mar. 28, 2014).
Staab, Wayne J., et al., "A One-Size Disposable Hearing Aid is Introduced", The Hearing Journal 53(4):36-41) Apr. 2000.
Stretchgoal—It's Your Dash (Feb. 14, 2014).
Stretchgoal—The Carrying Case for The Dash (Feb. 12, 2014).
Stretchgoal—Windows Phone Support (Feb. 17, 2014).
The Dash + The Charging Case & The BRAGI News (Feb. 21, 2014).
The Dash—A Word From Our Software, Mechanical and Acoustics Team + An Update (Mar. 11, 2014).
Update From BRAGI—$3,000,000—Yipee (Mar. 22, 2014).

* cited by examiner

DIVERSITY BLUETOOTH SYSTEM AND METHOD

PRIORITY STATEMENT

This application claims priority to U.S. Provisional Patent Application 62/244,167, filed on Oct. 20, 2015, and entitled Diversity Bluetooth System and Method, hereby incorporated by reference in its entirety.

FIELD OF THE INVENTION

The present invention relates to wearable devices. More particularly, but not exclusively, the present invention relates to ear pieces, wireless headphones and other devices.

BACKGROUND

Issues with the transmission and reception of Bluetooth signals remains challenging in many situations. Common areas of difficulty involve systems that requite close proximity of the communicating entities. There are numerous reasons for such difficulties. Variables such as materials which are impervious to penetration by radio waves at the frequencies used by Bluetooth technology continue to remain problematic. One example of such difficulty involves the use of wireless Bluetooth earpieces.

Depending on the location of the source and the location of the antenna of the earpiece or headphone, a reliable and stable connection might be difficult or impossible, since the body itself of the person wearing the headphones acts as a shield. This is especially notable if the antenna is located on one side of the head, and the source is carried on the opposite side, for example in a trouser, or even a shirt pocket.

Outdoors the connection is made even more difficult due to lack of radio reflecting surfaces (ceiling, close vertical walls, solid floor), so that a close to line of sight connection between the communication actors may be needed. What is needed are new systems and methods to address these issues.

SUMMARY

Therefore, it is a primary object, feature, or advantage of the present invention to improve over the state of the art.

It is a further object, feature, or advantage of the present invention to improve wireless connections in devices such as wearable devices such as ear pieces and head phones which connect wirelessly to other devices.

It is a still further object, feature, or advantage of the present invention to provide for methods and systems that may maintain connections even in significantly adverse environments.

Another object, feature, or advantage is to provide for methods and systems suitable to use for audio streaming.

Yet another object, feature, or advantage is to provide for lowering power utilization by creating optimal linkages.

A further object, feature, or advantage is to provide for addressing problems of weak transmissions at an underserved area.

A still further object, feature, or advantage is to provide a solution which allows devices to remain within Bluetooth standards while simultaneously delivering the required connection in the defined adverse environments.

One or more of these and/or other objects, features, or advantages of the present invention will become apparent from the specification and claims that follow. No single embodiment need provide each and every object, feature, or advantage. Different embodiments may have different objects, features, or advantages. Therefore, the present invention is not to be limited to or by an objects, features, or advantages stated herein.

According to one aspect a system includes a first device having a transceiver and an antenna operatively connected to the transceiver and a second device having a transceiver and an antenna operatively connected to the transceiver, the first device in operative communication with the second device through a communications linkage separate from the transceiver of the first device and the transceiver of the second device. The first device is adapted to wirelessly communicate with a remote device through the transceiver of the first device. The second device is adapted to wirelessly communicate with the remote device through the transceiver of the second device. The system is configured to evaluate the wireless connection between the first device and the remote device and to evaluate the wireless communication between the second device and the remote device and determine whether the first device or the second device has a better connection and if the first device has the better connection to use the wireless connection between the first device and the remote device and if the second device has the better connection to use the wireless connection between the second device and the remote device. The first device may be a left ear piece and the second device may be a right ear piece. The first device may be a left portion of a headphone set and the second device may be a right portion of the headphone system. The better connection may provide a stronger signal. The transceiver of the first device may be a Bluetooth transceiver and the transceiver of the second device may be a Bluetooth transceiver. The first device may be configured to receive streaming audio of the wireless connection between the first device and the remote device and the second device may be configured to receiving streaming audio of the wireless connection between the second device and the remote device. The communications linkage between the first device and the second device may be a wired linkage. The communications linkage between the first device and the second device may be a near field magnetic inductance (NFMI) wireless linkage. The communications linkage between the first device and the second device may be an ultra-wideband (UWB) wireless linkage. The transceiver of the first device and the transceiver of the second device may share connection data related to connection with the remote device. The transceiver of the first device and the transceiver of the second device may have synchronized protocol stacks. The first device and the second device may each perform signal measurements of signals from the remote device and share the signal measurements there between. The first device and the second device may be configured to coordinate handover of a connection with the remote device. The remote device may be a mobile device configured for communicating streaming audio.

According to another aspect, a system includes a first wearable device having a radio transceiver and an antenna operatively connected to the radio transceiver and a second wearable device having a radio transceiver and an antenna operatively connected to the radio transceiver, the first device in operative communication with the first device through a communications linkage separate from the radio transceiver of the first device and the radio transceiver of the second device. The first wearable device may be adapted to wirelessly communicate with a remote device through the radio transceiver of the first wearable device. The second wearable device may be adapted to wirelessly communicate with the remote device through the radio transceiver of the second wearable device. The first wearable device and the second wearable device may be adapted to perform signal measurements relative to the remote device and share measurement information and perform handovers there between. The first wearable device may be a left ear piece and the second wearable device may be a right ear piece. The first wearable device may be a left portion of a headphone set and the second wearable device may be a right portion of the headphone set.

According to another aspect, a method for improving signal communications is provided. The method includes providing a first wearable device and a second wearable device, monitoring at least one signal parameter associated with a signal communicated between a remote device and a radio transceiver of the first wearable device, monitoring at least one signal parameter between the remote device and a radio transceiver of the second wearable device. The method further includes communicating data between the first wearable device and the second wearable device over a communication channel separate than a communications channel between the radio transceiver of the first wearable device and the radio transceiver of the second wearable device. The method further includes connecting one of the first wearable device and the second wearable device, the one receiving a better signal based on a comparison of the at least one signal parameter associated with the signal communication between the remote device and the radio transceiver of the first wearable device and the at least one signal parameter associated with the signal.

DETAILED DESCRIPTION

The present invention relates to wearable devices including ear pieces, wireless headphones and other devices, especially where there are multiple wearable devices capable of being in operative communication with a remote device, an external device, or source. Such a remote device may be a mobile device such as a phone or tablet, or other type of computing device. Although various types of devices, wearable devices or personal area devices are contemplated, for purposes of explanation, generally the example of a wireless headphone or a set of wireless earpieces is used. In the case of the headphone, the wireless connection is the connection between the headphone and the external wireless device. The connection between the two earpieces may be wireless or may be a wired connection. A wireless headphone that necessitates the use of two radio units would suffice. The headphone or wireless earpiece set comprises two radio units, one per side. The source is bonded to only one of the two radios. The two radios are capable of communicating with each other over a separate channel which is not affected by the same propagation issues. Some examples of this separate channel is the use of UWB, magnetic induction such as NFMI or wired connections. One of the radios behaves in the normal fashion, e.g. it advertises its presence and services to the surrounding environment. The other radio is a clone of the visible one, e.g. if they were visible, they would be indistinguishable from the one the source talks to.

According to one example, coverage of Bluetooth wireless headphones is extended using coordinated radios. The radios in the headphone or earpieces share all the connection data related to the connected source and their protocol stacks can be synchronized. All the radios perform signal measurements in relation to the source and share the measurements information over the out-of-band channel. The radios coordinate among themselves a seamless handover of the connection to the source in order to achieve the best signal, depending on their position on the body. In particular, the radio with the best signal becomes active and takes over the communication from the previously connected radio. A connection can be established and maintained even in more adverse environments. Even in less adverse environments, the advantage of a lower power connection may be utilized.

Figure 1:
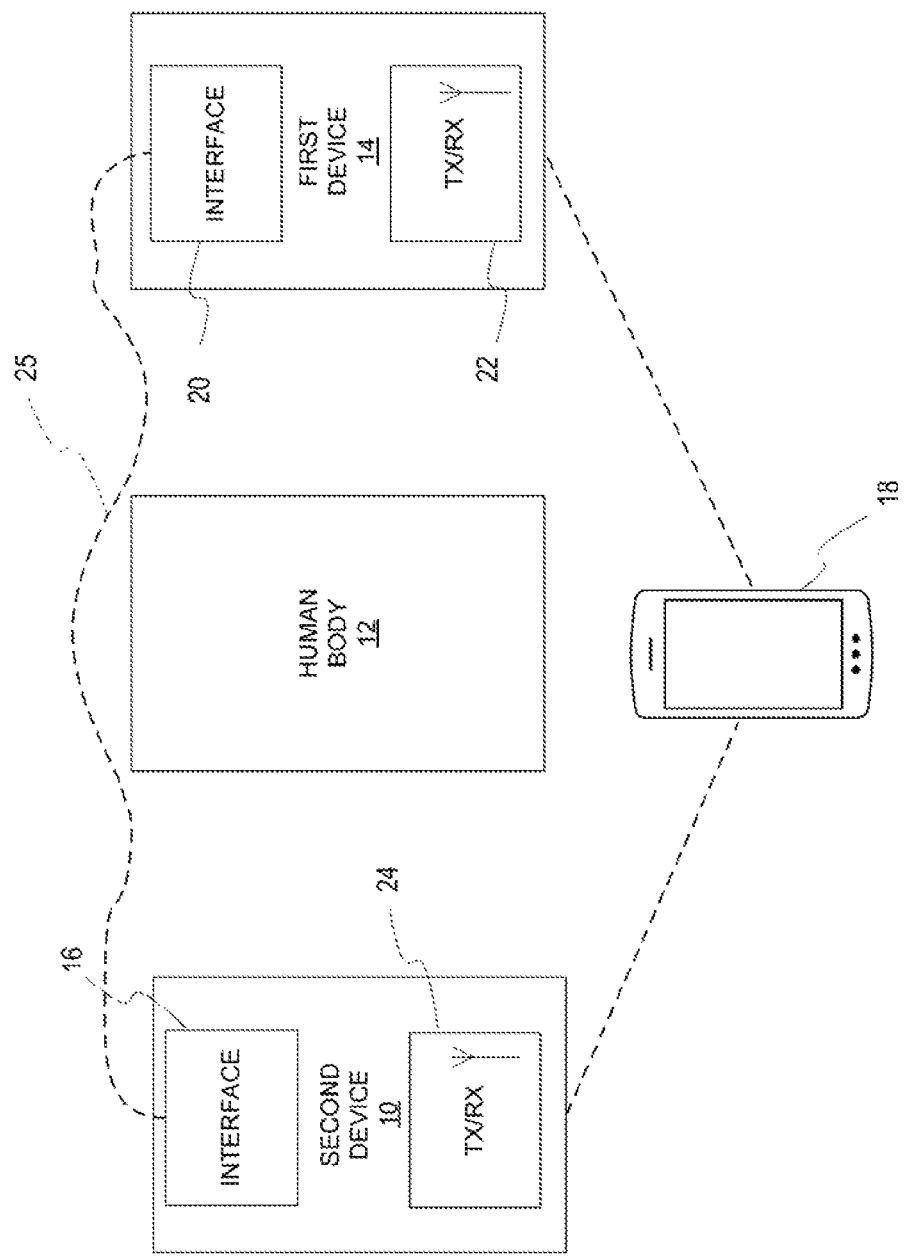
FIG. 1 illustrates one example of a system.

FIG. 1 illustrates one example of a system. As shown in FIG. 1 there is a first device 14 and a second device 10. The first device 14 and the second device 10 may be wearable devices such as ear pieces or portions of a headphone set, or other type of devices. A human body 12 may be situated between the first device 14 and the second device 10. A remote or external device or source 18 is also shown that may be in contact with the first device 14 and the second device 10. Note that the remote device 18 may be on one side of the human body 12 or the other side of the human body 12. Thus, for example, where the remote device 18 is a mobile phone, the mobile phone may, for example, be in the left pants pocket of a user or may be in the right pants pocket of the user. The location of the remote device 18 relative to the first device 14 or the second device 10 may adversely affect signal strength which may be problematic in various situations such as where the remote device 18 is sending streaming audio to the first device 14 and/or the second device 10. A transceiver such as a radio transceiver such as a Bluetooth transceiver 22 may be present in the first device 14 and another radio transceiver such as a Bluetooth transceiver 24 may be present in the second device 10. An antenna may be operatively connected to the transceiver 22 of the first device 14 and an antenna may be operatively connected to the transceiver 24 of the second device 10. In addition, the first device has an interface 20 and the second device has an interface 16 which put the first device 14 and the second device 10 in operative communication. The interfaces 16, 20 may be a wireless interface which provide for wireless communications such as through magnetic induction, near field magnetic induction (NFMI), ultra-wideband (UWB) or other types of wireless communications. Alternatively, the interfaces 16, 20 may connect with one another through a wired interface. Thus the interfaces 16, 20 may provide for a wireless linkage or a wired linkage.

The first device 14 and the second device 10 may both connect to the device 18 and may both analyze the signal from the device 18 such as to determine the strength of the signal. The first device 14 and the second device 10 may then communicate information about the measured signal strength or other signal characteristics through their linkage between interfaces 16, 20 to determine which of the devices is better receiving the signal from the device 18. Thus, the first device 14 and the second device 10 determine which device has a better connection with the device 18 and then use that connection for communications. It is contemplated that this ma be accomplished in various ways and use one or more signal parameters such as, but not limited to signal strength, signal-to-noise ratio, received signal strength indicator (RSSI), noise, signal quality or other signal measurements or other parameters. In addition both the first device 14 and the second device 10 may include an intelligent control (not shown) such as one or more processors or controllers which may be used to evaluate signals or may be involved in the switching. Alternatively, this functionality may be accomplished by the transceiver(s) 22, 24.

Both first device 14 and the second device 10 may perform signal measurements in relation to the source associated with the device 18 and share the measurement information over the out-of-band communications channel 25. In addition radios of the first device and the second device coordinate among themselves such as to provide a seamless handover of the connection to the device 18 or source in order to achieve the best signal. Thus, the radio with the best signal becomes active and takes over communications.

Figure 2:
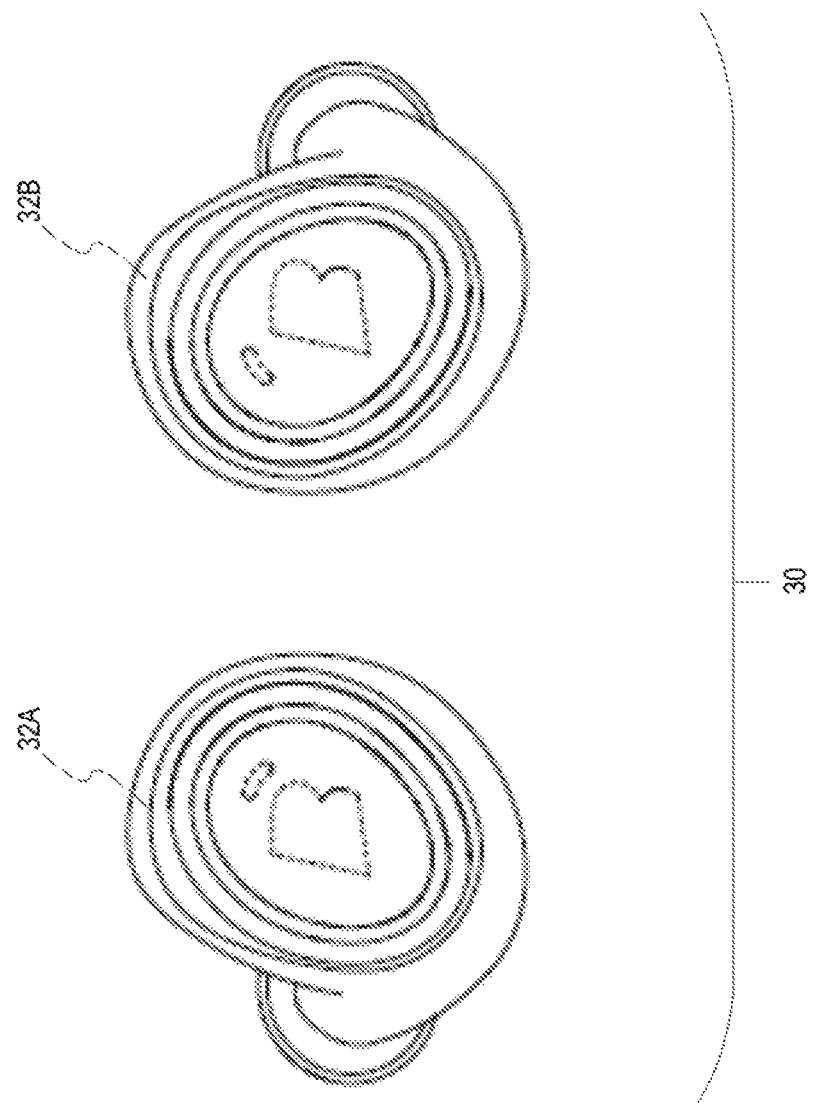
FIG. 2 illustrates one example of wearable devices in the form of left and right ear pieces.

FIG. 2 illustrates a set of ear pieces 30 which includes a left device 32A and a right device 32B. In such an embodiment, a wireless linkage may be used to communicate between the left device and the right device. The wireless linkage used is separate from any wireless linkage between the left device or right device and the remote device.

Figure 3:
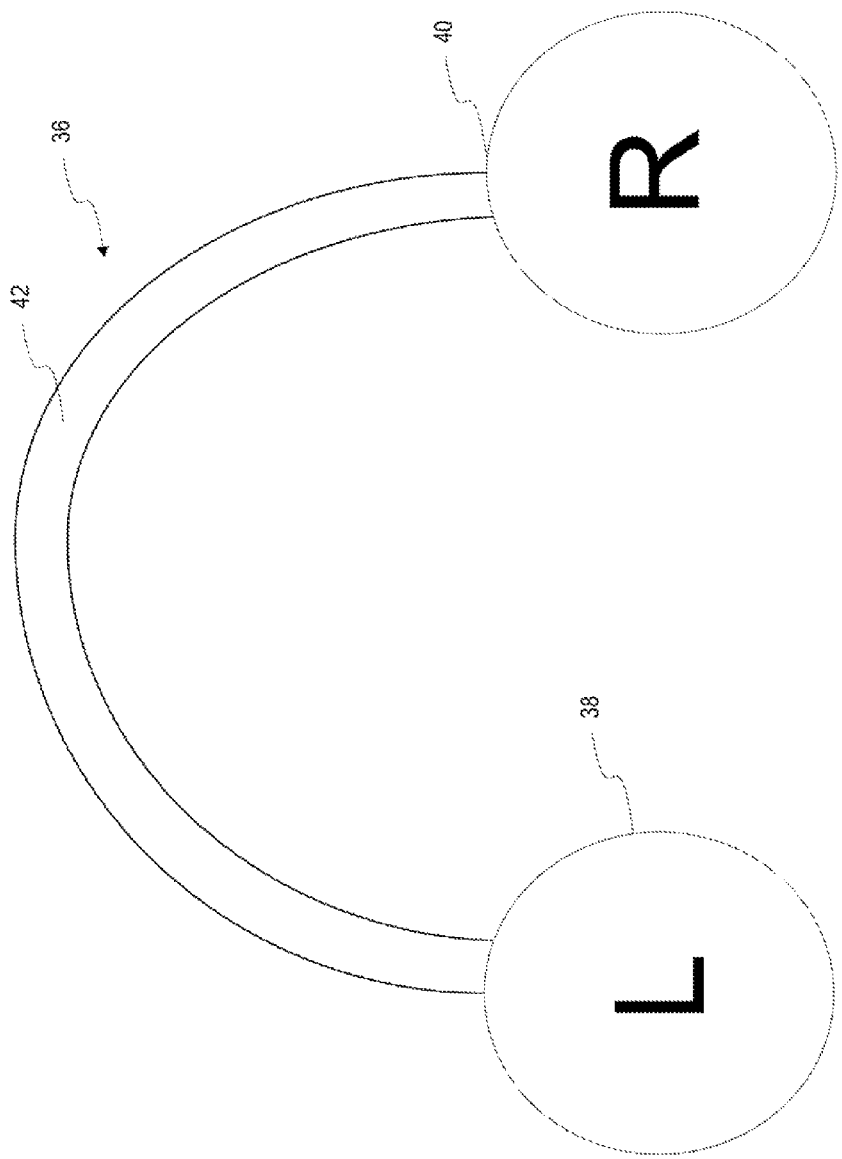
FIG. 3 illustrates one example of wearable devices in the form of headphones having left and right portions.

FIG. 3 illustrates a set of headphones 36 with a left device 36 and a right device 40 and a central portion 42 spanning between the left device 36 and the right device 40. In such an embodiment, a wired connection may be used between the left device and the right device, the wire (not shown) traversing the central portion 42.

Although various types of radio transceivers may be used according to various protocols and standards, various embodiments may be implemented that are consistent with the Bluetooth standard. It is observed that a multiuser diversity system would theoretically solve at least some of the problems addressed, but such a system works outside of the Bluetooth standard. Further, it would also be limited due to the fact that candidate receivers may not always be available. Thus, a universally stable solution is provided herein that does not require cooperation between transmitting device and the location of receiving devices. This advantageous because Bluetooth cannot implement such a standard; and there are benefits to remaining within the Bluetooth standard to maintain the compatibility of Bluetooth devices support.

It should also be appreciated that a connection can be established and maintained even in significantly adverse environments. This is especially important for problematic experiences of using an audio device streaming music while placed in a location unfavorable for stable streaming. One example is the use of an audio streaming device where the receiving unit is present in the right ear, and the audio streaming device is located in the user's left pants pocket. In the cited example, the receiving unit would switch from the right side to the left.

It should be further appreciated that one of the advantages of various embodiments relates to lower power utilization. Lower power utilization may be achieved, as the linkage is automatically established with the receiving unit in the optimal location for reception of the transmitted signal. One example would be facilitating the ability to link to a receiving unit which moves into a line of sight position.

In addition, advantages over typical antenna diversity solutions is achieved. Antenna diversity increases the level of difficulty of implementation of a proposed solution, while still suffering from the fact that no matter how many antennas are hypothesized, physical location in the desired area will still be required. The use of a physical unit at the desired location solves the problem of weak transmission to the underserved area.

What is claimed is:

1. A system comprising:
   a first wearable device having a radio transceiver and an antenna operatively connected to the radio transceiver;
   a second wearable device having a radio transceiver and an antenna operatively connected to the radio transceiver, the first wearable device in operative communication with the second wearable device through a communications linkage separate from the radio transceiver of the first wearable device and the radio transceiver of the second wearable device;
   wherein the first wearable device is adapted to wirelessly communicate with a remote device through the radio transceiver of the first wearable device;
   wherein the second wearable device is adapted to wirelessly communicate with the remote device through the radio transceiver of the second wearable device;
   wherein the system is configured to evaluate a first wireless signal, the first wireless signal between the radio transceiver of the first wearable device and the remote device, by measuring a signal characteristic of the first wireless signal at the first wearable device;
   wherein the system is configured to evaluate a second wireless signal, the second wireless signal between the radio transceiver of the second wearable device and the remote device, by measuring a signal characteristic of the second wireless signal at the second wearable device;
   wherein the system is configured to determine whether the first wearable device or the second wearable device has a better wireless connection with the remote device by comparing the signal characteristic of the first wireless signal and the signal characteristic of the second wireless signal and if the first wearable device has the better wireless connection to use the wireless connection between the radio transceiver of the first wearable device and the remote device and if the second wearable device has the better connection to use the wireless connection between the radio transceiver of the second wearable device and the remote device.

2. The system of claim 1 wherein the first wearable device is a left ear piece and the second wearable device is a right ear piece.

3. The system of claim 1 wherein the first wearable device is a left portion of a headphone set and the second wearable device is a right portion of the headphone set.

4. The system of claim 1 wherein the signal characteristic of the first wireless signal is signal strength and wherein the signal characteristic of the second wireless signal is signal strength.

5. The system of claim 1 wherein the radio transceiver of the first wearable device is a Bluetooth transceiver and wherein the radio transceiver of the second wearable device is a Bluetooth transceiver.

6. The system of claim 1 wherein the first wearable device is configured to receive streaming audio of the wireless connection between the radio transceiver of the first wearable device and the remote device and wherein the radio transceiver of the second wearable device is configured to receive streaming audio of the wireless connection between the radio transceiver of the second wearable device and the remote device.

7. The system of claim 1 wherein the communications linkage between the first wearable device and the second wearable device is a wired linkage.

8. The system of claim 1 wherein the communications linkage between the first wearable device and the second wearable device is a magnetic induction wireless linkage.

9. The system of claim 1 wherein the radio transceiver of the first wearable device and the radio transceiver of the second wearable device share connection data related to connection with the remote device.

10. The system of claim 1 wherein the radio transceiver of the first wearable device and the radio transceiver of the second wearable device have synchronized protocol stacks.

11. The system of claim 1 wherein the first wearable device and the second wearable device each perform signal measurements of signals from the remote device and share the signal measurements there between.

12. The system of claim 1 wherein the first wearable device and the second wearable device are configured to coordinate handover of a connection with the remote device.

13. The system of claim 1 wherein the remote device is a mobile device configured for communicating streaming audio.

14. The system of claim 1 further comprising:
wherein the first wearable device is a left ear piece and the second wearable device is a right ear piece;
wherein the radio transceiver of the first wearable device is a Bluetooth transceiver and wherein the radio transceiver of the second wearable device is a Bluetooth transceiver;
wherein the communications linkage between the first wearable device and the second wearable device is a near field magnet induction (NFMI) wireless linkage;
wherein the first wearable device is configured to receive streaming audio of the wireless connection between the first wearable device and the remote device and wherein the second wearable device is configured to receiving streaming audio of the wireless connection between the second wearable device and the remote device.

15. A system comprising:
a first wearable device having a radio transceiver and an antenna operatively connected to the radio transceiver;
a second wearable device having a radio transceiver and an antenna operatively connected to the radio transceiver, the first wearable device in operative communication with the first second wearable device through a communications linkage separate from the radio transceiver of the first wearable device and the radio transceiver of the second wearable device;
wherein the first wearable device is adapted to wirelessly communicate with a remote device through the radio transceiver of the first wearable device;
wherein the second wearable device is adapted to wirelessly communicate with the remote device through the radio transceiver of the second wearable device;
wherein the first wearable device and the second wearable device are adapted to perform radio signal measurements relative to the remote device and share radio signal measurement information and perform handovers there between;
wherein the radio signal measurements include at least one of signal strength, signal-to-noise ratio, and received signal strength indicator (RSSI).

16. The system of claim 15 wherein the first wearable device is a left ear piece and the second wearable device is a right ear piece.

17. The system of claim 15 wherein the first wearable device is a left portion of a headphone set and the second wearable device is a right portion of the headphone set.

18. A method for improving radio signal communications, the method comprising:
providing a first wearable device and a second wearable device;
monitoring at least one radio signal parameter associated with a radio signal communicated between a remote device and a radio transceiver of the first wearable device;
monitoring at least one radio signal parameter between the remote device and a radio transceiver of the second wearable device;
communicating data via a wired or wireless connection between the first wearable device and the second wearable device over a communication channel separate than a communications channel between the radio transceiver of the first wearable device and the radio transceiver of the second wearable device;
connecting one of the first wearable device and the second wearable device, the one receiving a better radio signal based on a comparison of the at least one radio signal parameter associated with the radio signal communication between the remote device and the radio transceiver of the first wearable device and the at least one radio signal parameter associated with the radio signal communicated between the remote device and the radio transceiver of the second wearable device;
wherein the at least one signal parameter includes at least one of signal strength, signal-to-noise ratio, and received signal strength indicator (RSSI).

19. The method of claim 18 wherein the first wearable device is a left ear piece and the second wearable device is a right ear piece.

20. The method of claim 18 wherein the first wearable device is a left portion of a headphone set and the second wearable device is a right portion of the headphone set.

* * * * *

UNITED STATES PATENT AND TRADEMARK OFFICE
CERTIFICATE OF CORRECTION

PATENT NO. : 9,980,189 B2
APPLICATION NO. : 15/290811
DATED : May 22, 2018
INVENTOR(S) : Belverato Page 1 of 1

It is certified that error appears in the above-identified patent and that said Letters Patent is hereby corrected as shown below:

In the Claims

Column 7 Line 44, Claim 15, Line 7, delete "first"

Signed and Sealed this
Seventeenth Day of July, 2018

Andrei Iancu
*Director of the United States Patent and Trademark Office*